United States Patent
Anderson

(10) Patent No.: US 8,504,234 B2
(45) Date of Patent: Aug. 6, 2013

(54) ROBOTIC PESTICIDE APPLICATION

(75) Inventor: Noel Wayne Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 78 days.

(21) Appl. No.: 12/859,913

(22) Filed: Aug. 20, 2010

(65) Prior Publication Data
US 2012/0042563 A1     Feb. 23, 2012

(51) Int. Cl.
*G01C 22/00*     (2006.01)

(52) U.S. Cl.
USPC .......................................................... 701/24

(58) Field of Classification Search
None
See application file for complete search history.

(56) References Cited

U.S. PATENT DOCUMENTS

| | | |
|---|---|---|
| 3,674,652 A | 7/1972 | Brown |
| 3,931,413 A | 1/1976 | Frick et al. |
| 4,067,714 A | 1/1978 | Willard, Sr. |
| 4,083,494 A | 4/1978 | Ballu |
| 4,146,383 A | 3/1979 | Hanway et al. |
| 4,150,970 A | 4/1979 | Ries et al. |
| 4,175,394 A | 11/1979 | Wiesboeck |
| 4,286,530 A | 9/1981 | Conley |
| 4,315,599 A | 2/1982 | Biancardi |
| 4,342,176 A | 8/1982 | Wolfe |
| 4,358,054 A | 11/1982 | Ehrat |
| 4,385,500 A | 5/1983 | Kjelgaard et al. |
| 4,398,384 A | 8/1983 | Klinner |
| 4,433,552 A | 2/1984 | Smith |
| 4,516,723 A | 5/1985 | Hesse |
| 4,588,127 A | 5/1986 | Ehrat |
| 4,610,122 A | 9/1986 | De Clercq |
| 4,638,594 A | 1/1987 | Huguet et al. |
| 4,704,986 A | 11/1987 | Remp et al. |
| 4,757,688 A | 7/1988 | Basiulis et al. |
| 4,832,263 A | 5/1989 | Poynor |
| 4,871,447 A | 10/1989 | Adamache |
| 4,903,903 A | 2/1990 | Benen |
| 4,949,656 A | 8/1990 | Lyle et al. |
| 4,970,973 A | 11/1990 | Lyle et al. |
| 4,982,898 A | 1/1991 | Ballu |
| 4,992,942 A | 2/1991 | Bauerle et al. |
| 5,076,497 A | 12/1991 | Rabitsch |

(Continued)

FOREIGN PATENT DOCUMENTS

| | | |
|---|---|---|
| DE | 3830647 A1 | 3/1990 |
| DE | 4413739 A1 | 10/1995 |

(Continued)

OTHER PUBLICATIONS

Eisenberg, "Digital Field Guides Eliminate the Guesswork", New York Times, May 10, 2009, pp. 1-2.

(Continued)

*Primary Examiner* — Thomas Tarcza
*Assistant Examiner* — Adam Alharbi
(74) *Attorney, Agent, or Firm* — Yee & Associates, P.C.

(57) ABSTRACT

The illustrative embodiments provide an apparatus for performing horticultural tasks comprising a processor unit, a first number of communication links from the processor unit to a plurality of databases stored on a number of data storage devices, and a second number of communication links from the processor unit to a diagnostic system. The processor unit is configured to execute the diagnostic system and access the plurality of databases on the number of data storage devices to identify a pest problem and generate a treatment plan to address the pest problem.

20 Claims, 9 Drawing Sheets

U.S. PATENT DOCUMENTS

| | | |
|---|---|---|
| 5,092,343 A | 3/1992 | Hale et al. |
| 5,092,422 A | 3/1992 | Hood, Jr. et al. |
| 5,140,917 A | 8/1992 | Swanson |
| 5,248,090 A | 9/1993 | Williamson |
| 5,255,857 A | 10/1993 | Hunt |
| 5,355,815 A | 10/1994 | Monson |
| 5,442,552 A | 8/1995 | Slaughter et al. |
| 5,601,236 A | 2/1997 | Wold |
| 5,740,038 A | 4/1998 | Hergert |
| 5,840,102 A | 11/1998 | McCracken |
| 5,870,302 A | 2/1999 | Oliver |
| 5,884,224 A | 3/1999 | McNabb et al. |
| 5,907,925 A | 6/1999 | Guyot |
| 5,913,915 A | 6/1999 | McQuinn |
| 5,915,313 A | 6/1999 | Bender et al. |
| 5,919,242 A | 7/1999 | Greatline et al. |
| 5,924,371 A | 7/1999 | Flamme et al. |
| 5,927,603 A | 7/1999 | McNabb |
| 5,979,703 A | 11/1999 | Nystrom |
| 5,991,687 A | 11/1999 | Hale et al. |
| 5,995,895 A | 11/1999 | Watt et al. |
| 6,039,212 A | 3/2000 | Singh |
| 6,079,340 A | 6/2000 | Flamme et al. |
| 6,089,743 A | 7/2000 | McQuinn |
| 6,116,519 A | 9/2000 | Williamson |
| 6,122,581 A | 9/2000 | McQuinn |
| 6,129,520 A | 10/2000 | Cooper |
| 6,141,614 A | 10/2000 | Janzen et al. |
| 6,178,253 B1 | 1/2001 | Hendrickson et al. |
| 6,199,000 B1 | 3/2001 | Keller et al. |
| 6,230,091 B1 | 5/2001 | McQuinn |
| 6,337,971 B1 | 1/2002 | Abts |
| 6,443,365 B1 | 9/2002 | Tucker et al. |
| 6,510,367 B1 | 1/2003 | McQuinn |
| 6,516,271 B2 | 2/2003 | Upadhyaya et al. |
| 6,549,851 B2 | 4/2003 | Greensides |
| 6,553,299 B1 | 4/2003 | Keller et al. |
| 6,574,979 B2 | 6/2003 | Faqih |
| 6,596,996 B1 | 7/2003 | Stone et al. |
| 6,597,991 B1 | 7/2003 | Meron et al. |
| 6,616,374 B2 | 9/2003 | Starr |
| 6,666,384 B2 | 12/2003 | Prandi |
| 6,671,698 B2 | 12/2003 | Pickett et al. |
| 6,684,648 B2 | 2/2004 | Faqih |
| 6,691,135 B2 | 2/2004 | Pickett et al. |
| 6,755,362 B2 | 6/2004 | Krieger et al. |
| 6,778,887 B2 | 8/2004 | Britton |
| 6,792,395 B2 | 9/2004 | Roberts |
| 6,802,153 B2 | 10/2004 | DuBois et al. |
| 6,854,209 B2 | 2/2005 | Van Horssen et al. |
| 6,862,083 B1 | 3/2005 | McConnell, Sr. et al. |
| 6,877,325 B1 | 4/2005 | Lawless |
| 6,907,319 B2 | 6/2005 | Hoelscher et al. |
| 6,928,339 B2 | 8/2005 | Barker |
| 6,941,225 B2 | 9/2005 | Upadhyaya et al. |
| 6,963,881 B2 | 11/2005 | Pickett et al. |
| 6,975,245 B1 | 12/2005 | Slater et al. |
| 6,978,794 B2 | 12/2005 | Dukes et al. |
| 7,063,276 B2 | 6/2006 | Newton |
| 7,069,692 B2 | 7/2006 | Kuiper et al. |
| 7,089,763 B2 | 8/2006 | Forsberg et al. |
| 7,171,912 B2 | 2/2007 | Fraisse et al. |
| 7,182,274 B2 | 2/2007 | Nies |
| 7,182,445 B2 | 2/2007 | Johnson et al. |
| 7,275,042 B1 | 9/2007 | Kelly et al. |
| 7,280,892 B2 | 10/2007 | Bavel |
| 7,317,972 B2 | 1/2008 | Addink et al. |
| 7,343,262 B2 | 3/2008 | Baumgarten et al. |
| 7,408,145 B2 | 8/2008 | Holland |
| 7,455,245 B2 | 11/2008 | Sipinski et al. |
| 7,469,707 B2 | 12/2008 | Anderson et al. |
| 7,565,139 B2 | 7/2009 | Neven, Sr. et al. |
| 7,577,105 B2 | 8/2009 | Takeoyoshi et al. |
| 7,610,122 B2 | 10/2009 | Anderson |
| 7,617,992 B2 | 11/2009 | Ivans |
| 7,686,499 B2 | 3/2010 | Dykstra et al. |
| 7,775,168 B2 | 8/2010 | Sidhwa et al. |
| 7,805,221 B2 | 9/2010 | Nickerson |
| 7,809,475 B2 | 10/2010 | Kaprielian |
| 7,837,958 B2 | 11/2010 | Crapser et al. |
| 7,844,368 B2 | 11/2010 | Alexanian |
| 7,854,108 B2 | 12/2010 | Koselka et al. |
| 7,930,085 B2 | 4/2011 | Anderson et al. |
| 7,957,850 B2 | 6/2011 | Anderson |
| 8,028,470 B2 | 10/2011 | Anderson |
| 8,150,554 B2 | 4/2012 | Anderson |
| 8,170,405 B2 | 5/2012 | Harris |
| 2002/0011075 A1 | 1/2002 | Faqih |
| 2002/0170229 A1 | 11/2002 | Ton et al. |
| 2003/0019408 A1 | 1/2003 | Fraisse et al. |
| 2003/0215354 A1* | 11/2003 | Clark et al. ................... 422/22 |
| 2003/0229434 A1 | 12/2003 | Miedema |
| 2004/0034459 A1 | 2/2004 | Hoelscher et al. |
| 2004/0078092 A1 | 4/2004 | Addink et al. |
| 2004/0231240 A1 | 11/2004 | Kuiper et al. |
| 2005/0129034 A1 | 6/2005 | Takeyoshi et al. |
| 2005/0187665 A1 | 8/2005 | Fu |
| 2005/0199842 A1 | 9/2005 | Parsons et al. |
| 2006/0026556 A1 | 2/2006 | Nishimura |
| 2006/0089260 A1 | 4/2006 | Di et al. |
| 2007/0042803 A1 | 2/2007 | Anderson |
| 2007/0220808 A1 | 9/2007 | Kaprielian et al. |
| 2008/0061163 A1 | 3/2008 | Kubby et al. |
| 2008/0097653 A1 | 4/2008 | Kaprielian et al. |
| 2008/0190020 A1 | 8/2008 | Todd |
| 2008/0288116 A1 | 11/2008 | Nickerson |
| 2009/0001193 A1 | 1/2009 | Parsons et al. |
| 2009/0019826 A1 | 1/2009 | Rigney |
| 2009/0179165 A1 | 7/2009 | Parsons et al. |
| 2009/0241580 A1 | 10/2009 | Hill et al. |
| 2009/0259483 A1 | 10/2009 | Hendrickson et al. |
| 2009/0281672 A1 | 11/2009 | Pourzia |
| 2009/0314862 A1 | 12/2009 | Bauman et al. |
| 2010/0032495 A1 | 2/2010 | Abts |
| 2010/0034466 A1 | 2/2010 | Jing et al. |
| 2010/0054543 A1 | 3/2010 | Pachys |
| 2010/0109260 A1 | 5/2010 | Pande |
| 2010/0243754 A1* | 9/2010 | Harris ................................. 239/34 |
| 2010/0263275 A1 | 10/2010 | Anderson |
| 2010/0268390 A1 | 10/2010 | Anderson |
| 2010/0268391 A1 | 10/2010 | Anderson |
| 2010/0268562 A1 | 10/2010 | Anderson |
| 2010/0268679 A1 | 10/2010 | Anderson |
| 2010/0313799 A1 | 12/2010 | Sidhwa et al. |
| 2010/0332475 A1* | 12/2010 | Birdwell et al. ............... 707/737 |
| 2011/0089260 A1 | 4/2011 | Van Roemburg |
| 2011/0301755 A1 | 12/2011 | Anderson |
| 2011/0313577 A1 | 12/2011 | Anderson |
| 2012/0046790 A1 | 2/2012 | Anderson |
| 2012/0046837 A1 | 2/2012 | Anderson |
| 2012/0150355 A1 | 6/2012 | Anderson |

FOREIGN PATENT DOCUMENTS

| | | |
|---|---|---|
| DE | 10002880 C1 | 6/2001 |
| DE | 10148747 A1 | 4/2003 |
| DE | 10221948 A1 | 11/2003 |
| EP | 2243353 A1 | 10/2010 |
| EP | 2423860 A2 | 2/2012 |
| EP | 2426628 A2 | 3/2012 |
| GB | 1597988 | 9/1981 |
| GB | 1603661 | 11/1981 |
| GB | 2462720 A | 2/2010 |
| WO | 0232222 A1 | 4/2002 |
| WO | 2006060854 A1 | 6/2006 |
| WO | 2009059373 A1 | 5/2009 |

OTHER PUBLICATIONS

Schwartz, "Engineer Uses Solar Energy, Wax, and Human Sweat to Fight Malaria", CleanTechnica.com, retrieved Jul. 16, 2010, pp. 1-3.

YouTube—Google Goggles, pp. 1-2 http://www.youtube.com/watch?v=Hhgfz0zPmH4.

"Google Goggles (Labs): Overview", Google Mobile, pp. 1-2, retrieved Jun. 1, 2010=.

U.S. Appl. No. 12/859,877, filed Aug. 20, 2010, Anderson.

U.S. Appl. No. 12/860,036, filed Aug. 20, 2010, Anderson.

"The AW-5000-MC," Air Water Corporation, http://www.airwatercorp.com, Feb. 12, 2010, 1 page.

Chesmore, "The Automated Identification of Taxa: Concepts and Applications," In: Automated Taxon Identification Systematics: Theory, Approaches and Applications, McLeod (Ed.), CRC Press, Boca Raton, Florida, pp. 83-100, Jul. 23, 2007.

El-Helly et al., "Integrating Diagnostic Expert System with Image Processing via Loosely Coupled Technique," INFOS2004, The 2nd International Conference on Informatics and Systems, Cairo, Egypt, Mar. 6-8, 2004, 15 pages.

Fleurat-Lessard et al., "Acoustic Detection and Automatic Identification of Insect Stages Activity in Grain Bulks by Noise Spectra Processing Through Classification Algorithms," 9th International Working Conference on Stored Product Protection, Sao Paulo, Brazil, Oct. 15-18, 2006, 11 pages.

Fynn, "A Decision Model for Resource Management Using Rule-Based Utility Functions and Parameter Selection," Dissertation, Ohio State University, Columbus, Ohio, 1988, 209 pages.

Garcia, "Eavesdropping on Insects in Soil and Plants," U.S. Department of Agriculture, Agricultural Research Service, Jan. 5, 2001, (last modified Jul. 10, 2012), 1 page.

Griepentrog et al., "Autonomous Systems for Plant Protection," In: Precision Crop Protection—The Challenge and Use of Heterogeneity, Oerke et al. (Eds.), Springer Netherlands, New York, New York, pp. 323-333, Aug. 2010.

Gwatipedza et al., "A General Monopolistic Competition Economic Model of the Horticultural Industry with a Risk of Invasion," U.S. Department of Agriculture, Dec. 6, 2007, 27 pages.

Hardaker et al., "Assessment of the Output of a Stochastic Decision Model," Australian Journal of Agricultural Economics, 17(3):170-178, Dec. 1973.

Munoz-Carpena et al., "Automatic Irrigation Based on Soil Moisture for Vegetable Crops," University of Florida, Gainesville, Florida, IFAS Extension, No. ABE356, pp. 1-5, Jun. 2005.

Muselli et al., "Dew Water Collector for Potable Water in Ajaccio (Corsica Island, France)," Atmospheric Research, 64:297-312, 2002.

Pande et al., "mKRISHI: A Mobile Multimedia Agro Advisory System for Remote Rural Farmers," http://www.ics.uci.edu/jain/papers/ACM_mm09_mKRISHI_non_blind.pdf, Apr. 20, 2009, 12 pages.

Perret et al., "Humidification-Dehumidification System in a Greenhouse for Sustainable Crop Production," 9th International Water Technology Conference, IWTC9 2005, Sharm El-Sheikh, Egypt, Biosystems Engineering, Academic Press, 91(3):849-862, Jul. 2005.

Pontikakos et al., "Location-Aware System for Olive Fruit Fly Spray Control," Computers and Electronics in Agriculture, 70:355-368, 2010.

Potamitis et al., "On Automatic Bioacoustic Detection of Pests: The Cases of *Rhynchophorus ferrugineus* and *Sitophilus oryzae*," Journal of Economic Entomology, 102(4):1681-1690, Aug. 2009.

Prasad et al., "A Study on Various Expert Systems in Agriculture," Georgian Electronic Scientific Jounal: Computer Science and Telecommunications, 4(11):81-86, Nov. 2006.

Romero, "Rish Programming for Agricultural Resource Allocation: A Multidimensional Risk Approach," Annals of Operations Research, 94:57-68, Jan. 2000.

Sim et al., "Implementation of an XML-based Multimedia Pests Information System for USN Environment," Proceedings of the 10th ACIS International Conference on Software Engineering, Artificial Intelligences, Networking and Parallel/Distributed Computing, pp. 597-601, May 27, 2009.

Tomasini, "Insect (Adult and Larva) Detection Equipment in Stored Grain—EWD Technology," EWD Training Seminar Lite, Saint-Chamas/Carqueiranne, France, May 10-11, 2004, 8 pages.

Woodford, "Connectionist-Based Intelligent Information Systems for Image Analysis and Knowledge Engineering: Applications in Horticulture," Thesis, The University of Otago, Dunedin, New Zealand, pp. 1-9, Dec. 11, 2003.

European Search Report regarding European Application No. 10160613.5, dated Jul. 26, 2010, 6 pages.

European Office Action regarding European Application No. 10160613.5, dated Mar. 29, 2012, 4 pages.

European Search Report regarding European Application No. 10160618.4, dated Jul. 26, 2010, 5 pages.

European Search Report regarding European Application No. 11170005.0, dated Oct. 25, 2011, 8 pages.

European Search Report regarding European Application No. 11176681.2, dated Jun. 6, 2012, 8 pages.

European Search Report regarding European Application No. 11176689.5, dated Jun. 14, 2012, 10 pages.

European Search Report regarding European Application No. 11176697.8, dated Dec. 22, 2011, 7 pages.

\* cited by examiner

ROBOTIC PESTICIDE APPLICATION

CROSS REFERENCE TO RELATED APPLICATIONS

This application is related to commonly assigned and co-pending U.S. patent application Ser. No. 12/859,877 filed on Aug. 20, 2010 and entitled "Automated Plant Problem Resolution"; U.S. patent application Ser. No. 12/860,036 filed on Aug. 20, 2010 and entitled "Networked Chemical Dispersion System" all of which are hereby incorporated by reference.

FIELD OF THE INVENTION

The present invention relates generally to a horticultural control system and, more particularly, to automated pesticide application system.

BACKGROUND OF THE INVENTION

Horticulture is the industry and science of plant cultivation. Horticulturists work and conduct research in the disciplines of plant propagation and cultivation, crop production, plant breeding and genetic engineering, plant biochemistry, and plant physiology. The work particularly involves fruits, berries, nuts, vegetables, flowers, trees, shrubs, and turf. Horticulturists work to improve crop yield, quality, nutritional value, and resistance to insects, diseases, and environmental stresses.

One aspect of horticultural management is addressing pests and insects that present potential plant problems. These pests and insects may have varied affect on different types of plants. Different climates and regions may also present varied types of pests and insects to manage.

Various pesticides are used to manage pests and insects in horticultural settings. These pesticides may present a number of additional considerations, such as the environmental effect, effectiveness, endurance, frequency of re-application, and the affect on other living things, such as pets and humans.

SUMMARY

The illustrative embodiments provide an apparatus for performing horticultural tasks. In an illustrative embodiment, an apparatus is comprised of a processor unit, a first number of communication links from the processor unit to a plurality of databases stored on a number of data storage devices, and a second number of communication links from the processor unit to a diagnostic system. The processor unit is configured to execute the diagnostic system and access the plurality of databases on the number of data storage devices to identify a pest problem and generate a treatment plan to address the pest problem.

The different illustrative embodiments further provide a vehicle comprising a machine controller, a steering system, a propulsion system, a link for receiving input from a number of sensors, and a diagnostic system. The diagnostic system is configured to identify pest problems and generate treatment plans to address the pest problems identified. The machine controller is connected to the diagnostic system. The machine controller uses the diagnostic system to identify a pest problem for an area.

The different illustrative embodiments further provide a system for managing pest problems comprising a mission planner, a horticultural knowledge base, a logistics database, and a home site database. The mission planner is configured to receive information and analyze the information to identify a number of pest problems and a number of treatment options. The horticultural knowledge base includes information about a number of pests. The logistics database includes information about a number of pest treatments. The home site database includes information about a given area.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
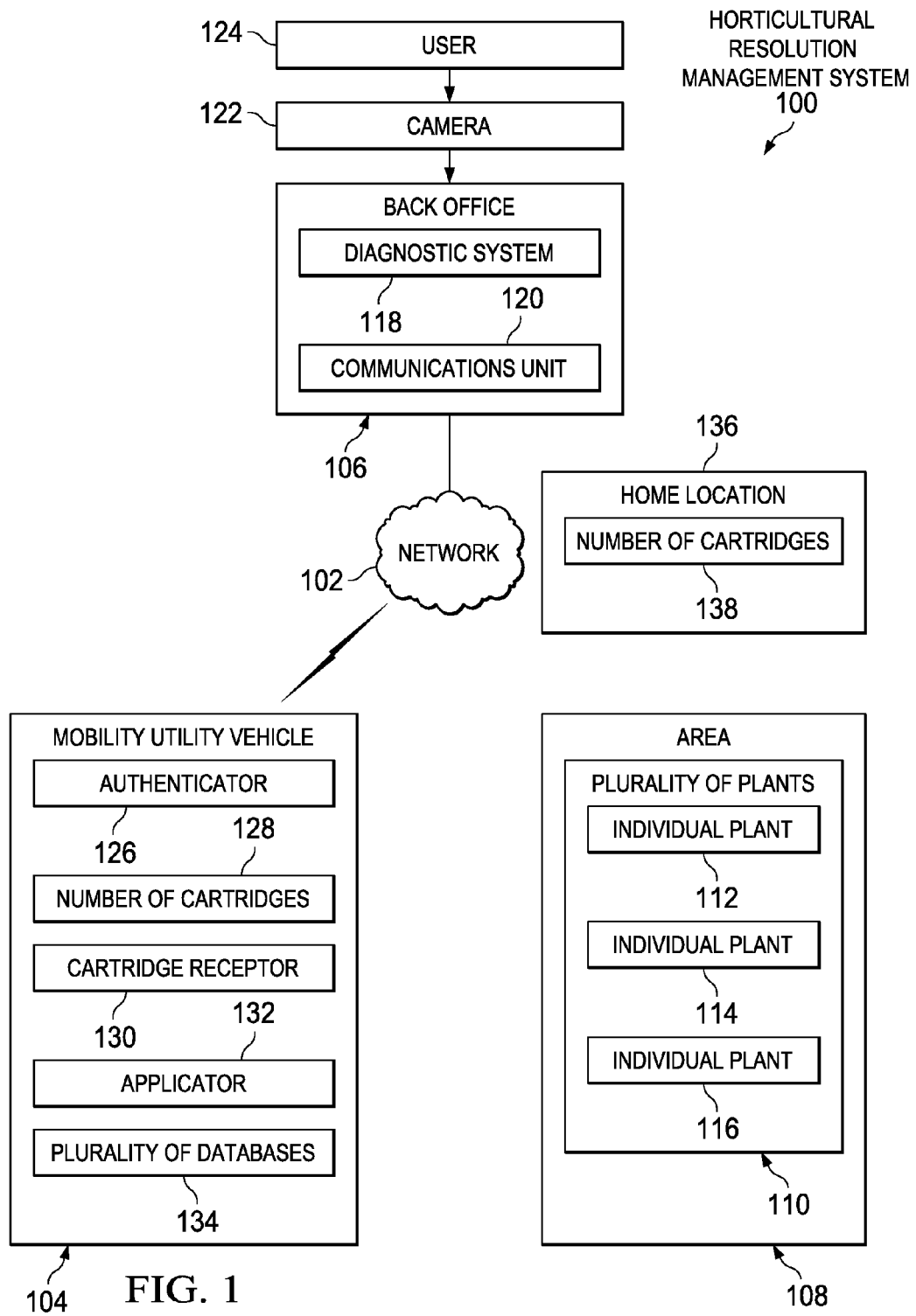
FIG. 1 is a block diagram of a horticultural resolution management system in which an illustrative embodiment may be implemented.

FIG. 1 is a block diagram of a horticultural resolution management system in which an illustrative embodiment may be implemented. Horticultural resolution management system 100 may be implemented in a network of computers in which the illustrative embodiments may be implemented. Horticultural resolution management system 100 contains network 102, which is the medium used to provide communications links between various devices and computers connected together within horticultural resolution management system 100, such as mobile utility vehicle 104 and back office 106. Network 102 may include connections, such as wire, wireless communication links, or fiber optic cables.

In the depicted example, mobile utility vehicle 104 connects to network 102 in a wireless configuration while back office 106 has a hard connection to network 102. In another illustrative embodiment, both mobile utility vehicle 104 and back office 106 may connect to network 102 in a wireless configuration. Back office 106 may be, for example, personal computers or network computers. In one illustrative example, back office 106 provides data, such as boot files, operating system images, and applications, to mobile utility vehicle 104. Mobile utility vehicle 104 is a client to back office 106 in this example. Horticultural resolution management system 100 may include additional servers, clients, and other devices not shown. For example, horticultural resolution management system 100 may include any number of mobile utility vehicles.

Horticultural resolution management system 100 may be used to identify, diagnose, and manage treatment for a number of different horticultural needs. As used herein, horticultural needs refer to, for example, without limitation, plant problems, pest problems, insect problems, environmental problems, water management, resource management, and/or any other suitable horticultural need.

Horticultural resolution management system 100 includes area 108. Area 108 is any location in which plurality of plants 110 may be located. Area 108 may be, for example, a flowerbed, garden, yard, lawn, landscape, park, agricultural field, athletic field, field, green, golf course, fairway, rough, orchard, vineyard, or any other area of recreational land.

Plurality of plants 110 includes individual plant 112, individual plant 114, and individual plant 116, in this illustrative example. Individual plant 112, individual plant 114, and individual plant 116 may be homogenous or heterogeneous plant varieties and/or species. In one illustrative embodiment, individual plants 112, 114, and 116 may be located in the same portion of area 108. In another illustrative embodiment, individual plants 112, 114, and 116 may be located in separate portions of area 108. In yet another illustrative embodiment, individual plants 112, 114, and 116 may be grouped together in homogenous groupings, or may be grouped together in heterogeneous groupings. Individual plants 112, 114, and 116 may be grouped together in a dense arrangement, or may be spaced apart in any number of arrangements and distances within area 108.

Individual plants 112, 114, and 116 are used as an illustrative example of a number of plants that may be present in area 108. Area 108 may contain a number of heterogenous plants and/or a number of homogeneous plants. As used herein, each plant may refer to one or more plants within a category of plants, and/or one or more plants within a common area of location. For example, in an illustrative embodiment, if area 108 is a golf course, individual plant 112 may represent a number of types of plants and/or vegetation on the areas of the golf course referred to as the green, while individual plant 114 may represent a number of types of plants and/or vegetation on the areas of the golf course referred to as the rough.

Back office 106 includes diagnostic system 118 and communications unit 120. Diagnostic system 118 is a software agent that may use information about plurality of plants 110 and/or area 108 to identify, diagnose, and generate treatment plans for horticultural needs. In these examples, information may include image data, audio data, textual data, user-supplied information, learned information using a number of databases, and/or any other suitable information about horticultural needs. Diagnostic system 118 may receive information using communications unit 120. Communications unit 120, in these examples, provides for communications with other data processing systems or devices, such as mobile utility vehicle 104, for example. Communications unit 310 may provide communications through the use of either or both physical and wireless communications links using network 102.

In one advantageous embodiment, diagnostic system 118 may receive information from mobile utility vehicle 104. In another advantageous embodiment, diagnostic system 118 may receive information from camera 122 operated by user 124. Camera 122 may transmit images to back office 106 via a wired or wireless connection using network 102, for example. In yet another advantageous embodiment, diagnostic system 118 may receive information directly from user 124 through a user interface, for example. Diagnostic system 118 uses the information received to identify the horticultural need and generate a treatment plan for treatment of the need. Diagnostic system 118 may send the treatment plan to mobile utility vehicle 104 for autonomous resolution of the identified horticultural need, in one illustrative embodiment. In another illustrative embodiment, diagnostic system 118 may display the treatment plan via a user interface to user 124 for manual resolution.

Mobile utility vehicle 104 includes authenticator 126, number of cartridges 128, cartridge receptor 130, applicator 132, and plurality of databases 134. Authenticator 126 may be a software agent configured to authenticate number of cartridges 128 and/or the treatment plan received from diagnostic system 118. Authenticator 126 may access plurality of databases 134 when authenticating number of cartridges 128 and/or the treatment plan. Plurality of databases 134 may include a cartridge authentication database, a treatment plan authentication database, and/or any other suitable database for mobile utility vehicle 104.

In these examples, a cartridge may refer to a component having a number of resource reservoirs. A resource may be, for example, without limitation, chemicals, water, fertilizer, herbicide, insecticide, pesticide, fungicide, plant food, nutrients, and/or any other suitable resource for horticultural use. Number of cartridges 128 may contain a number of resources used by applicator 132 of mobile utility vehicle 104 in area 108, for example. In an illustrative example, number of cartridges 128 may be chemical cartridges used for autonomous application of chemicals to area 108 and/or plurality of plants 110 by mobile utility vehicle 104. Cartridge receptor 130 is a component that is configured to receive number of cartridges 128, secure number of cartridges 128 to and/or within mobile utility vehicle 104, and provide applicator 132 access to the resources within number of cartridges 128.

In an illustrative example, mobile utility vehicle 104 may autonomously traverse area 108, capturing information about area 108. The information may be, for example, data about specific pests within area 108 that are undesirable. Mobile utility vehicle 104 may wirelessly transmit the information captured to diagnostic system 118 using network 102, in this example. Diagnostic system 118 uses the information received from mobile utility vehicle 104 to identify a horticultural need for area 108. Diagnostic system 118 identifies a number of treatment options and generates a treatment plan for treatment of the need identified. Diagnostic system 118 sends the treatment plan to mobile utility vehicle 104 using network 102. Authenticator 126 receives the treatment plan from diagnostic system 118 and authenticates the treatment plan using plurality of databases 134. Mobile utility vehicle 104 may identify required resources associated with the treatment plan, and determine whether these resources are included within mobile utility vehicle 104, for example.

In one illustrative example, mobile utility vehicle may determine that additional cartridges are needed in order to execute the treatment plan. In this example, mobile utility vehicle 104 travels to home location 136 to access number of cartridges 138. Number of cartridges 138 may be stored cartridges accessible to mobile utility vehicle 104, for example. Mobile utility vehicle 104 selects the appropriate number of cartridges 128 for the treatment plan received using cartridge receptor 130, and authenticator 126 authenticates number of cartridges 128. In these examples, authentication refers to identifying whether the cartridges selected are compatible with the cartridge receptor of a mobile utility vehicle, whether the resources within the cartridges selected are the resources specified in the treatment plan, and whether the treatment plan received is from an authorized source.

The illustration of horticultural resolution management system 100 in FIG. 1 is intended as an example, and not as an architectural limitation to the manner in which the different illustrative embodiments may be implemented. Other components may be used in addition to or in place of the ones illustrated for horticultural resolution management system 100 in other illustrative embodiments. For example, in some illustrative embodiments a set of mobile utility vehicles may be used in addition to mobile utility vehicle 104. In another illustrative example, diagnostic system 118 may be implemented directly within mobile utility vehicle 104.

In yet another illustrative embodiment, horticultural resolution management system 100 may represent a system for addressing horticultural tasks other than pest or plant problems. A horticultural task may include, without limitation, watering, pruning, cultivating, and winterizing a number of plants. As used herein, a number refers to one or more plants.

As used herein, "vehicle" refers to any number of different types of vehicles, including, without limitation, ground vehicles, land vehicles, air vehicles, water vehicles, sub-surface vehicles, and/or any other suitable type of vehicle.

Figure 2:
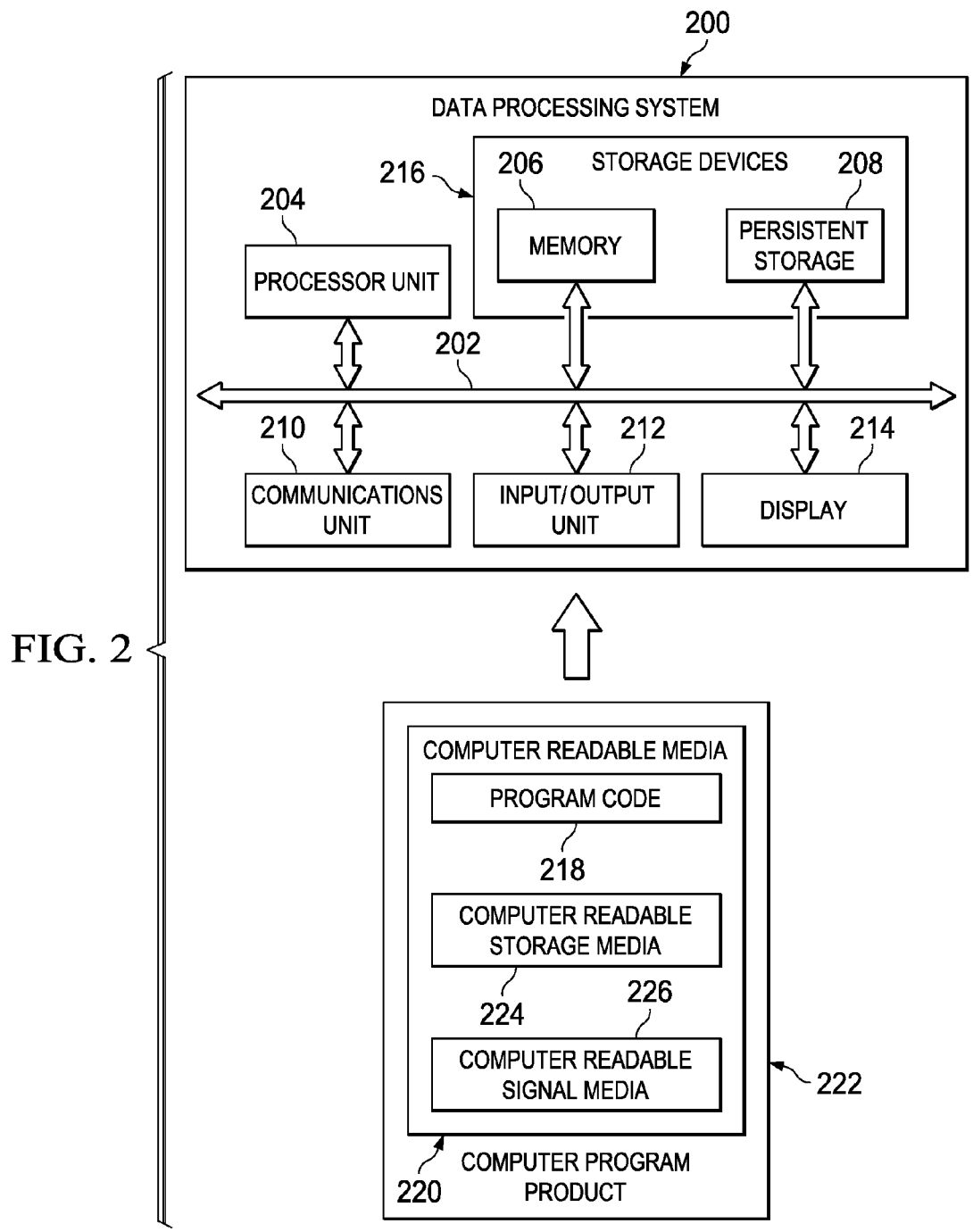
FIG. 2 is a block diagram of a data processing system in accordance with an illustrative embodiment.

With reference now to FIG. 2, a block diagram of a data processing system is depicted in accordance with an illustrative embodiment. Data processing system 200 is an example of a data processing system that may be used to implement servers and clients, such as back office 106 and mobile utility vehicle 104 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that identifying and treating pest and insect problems is currently a labor intensive task. When a pest or insect infestation is noticed by a home owner, for example, the home owner typically engages in various manual applications of pesticides or insecticides to attempt to eradicate the problem. Alternately, the home owner may hire an outside source to apply pesticides around a yard or home. The home owner must then monitor the results and determine when future applications are necessary. This implementation may involve contacting a professional lawn or gardening service, making a trip to a retailer for supplies, ordering chemicals, studying chemical application, performing the chemical application, cleaning up after the application, and then storing any unused chemicals. This current approach is time consuming and often results in leftover chemicals being stored and presenting potential safety hazards.

Thus, the illustrative embodiments provide an apparatus for performing horticultural tasks. In an illustrative embodiment, an apparatus is comprised of a processor unit, a first number of communication links from the processor unit to a plurality of databases stored on a number of data storage devices, and a second number of communication links from the processor unit to a diagnostic system. The processor unit is configured to execute the diagnostic system and access the plurality of databases on the number of data storage devices to identify a pest problem and generate a treatment plan to address the pest problem.

The different illustrative embodiments further provide a vehicle comprising a machine controller, a steering system, a propulsion system, a link for receiving input from a number of sensors, and a diagnostic system. The diagnostic system is configured to identify pest problems and generate treatment plans to address the pest problems identified. The machine controller is connected to the diagnostic system. The machine controller uses the diagnostic system to identify a pest problem for an area.

The different illustrative embodiments further provide a system for managing pest problems comprising a mission planner, a horticultural knowledge base, a logistics database, and a home site database. The mission planner is configured to receive information and analyze the information to identify a number of pest problems and a number of treatment options. The horticultural knowledge base includes information about a number of pests. The logistics database includes information about a number of pest treatments. The home site database includes information about a given area.

Figure 3:
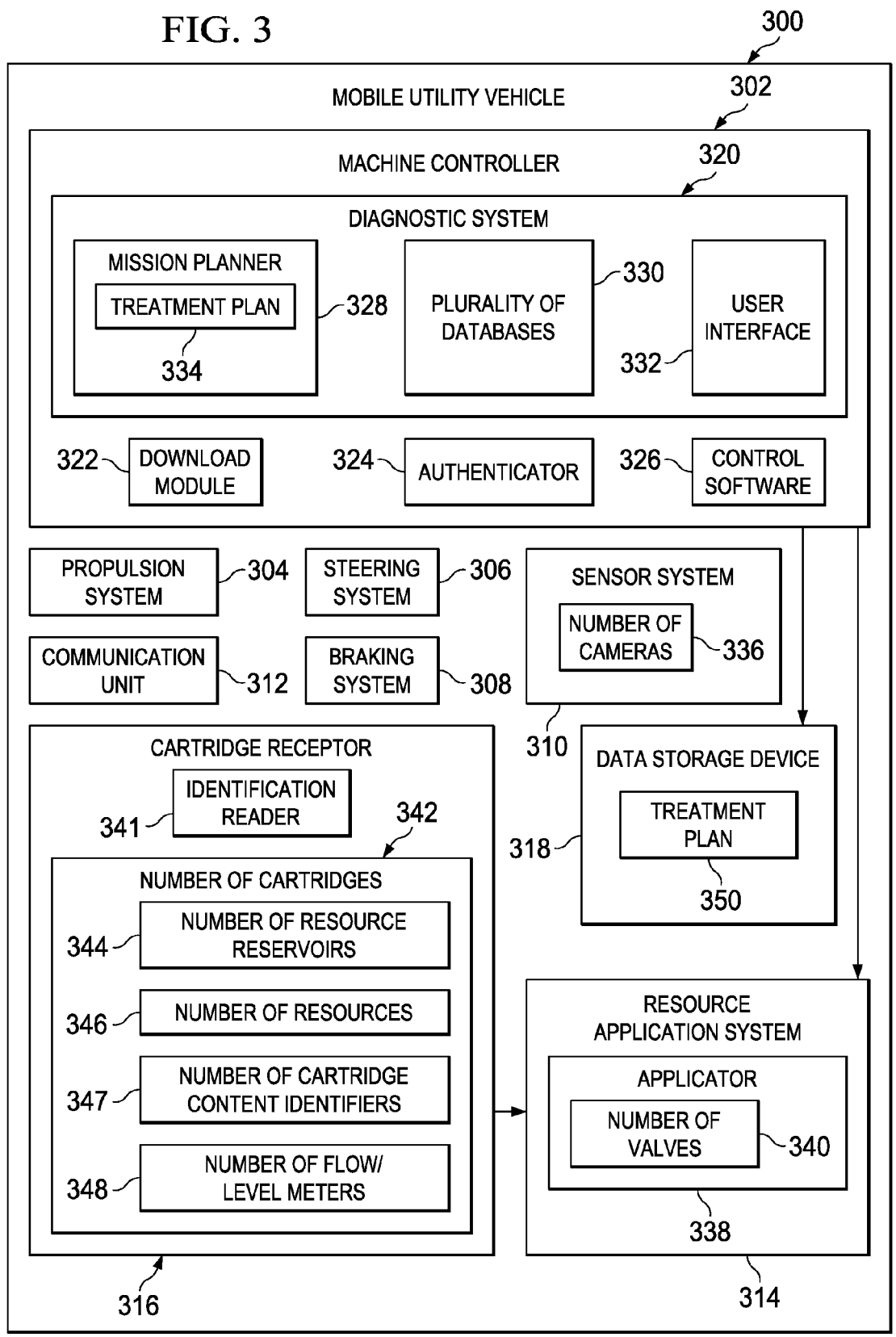
FIG. 3 is a block diagram of a mobile utility vehicle in accordance with an illustrative embodiment.

With reference now to FIG. 3, a block diagram of a mobile utility vehicle is depicted in accordance with an illustrative embodiment. Mobile utility vehicle 300 is an example of one implementation for mobile utility vehicle 104 in FIG. 1.

As illustrated, mobile utility vehicle 300 includes machine controller 302, propulsion system 304, steering system 306, braking system 308, sensor system 310, communications unit 312, resources application system 314, cartridge receptor 316, and data storage device 318.

Machine controller 302 includes diagnostic system 320, download module 322, authenticator 324, and control software 326. Machine controller 302 may be, for example, a data processing system, such as data processing system 200 in FIG. 2, or some other device that may execute processes to control movement of mobile utility vehicle 300 and/or components of mobile utility vehicle 300, such as resource application system 314, for example. Machine controller 302 may be, for example, a computer, an application integrated specific circuit, and/or some other suitable device. Different types of devices and systems may be used to provide redundancy and fault tolerance. Machine controller 302 may be connected to the different components and systems of mobile utility vehicle 300, such as propulsion system 304, steering system 306, braking system 308, sensor system 310, communications unit 312, resource application system 314, cartridge receptor 316, and data storage device 318. As used herein, connected to refers to the machine controller being in communication with the different components and systems of mobile utility vehicle 300 in a manner such that information can be exchanged between machine controller 302 and the different components and systems of mobile utility vehicle 300. In an illustrative example, information may be anything can be sent between the components and systems of mobile utility vehicle 300 to operate mobile utility vehicle 300.

Examples of information include, but are not limited to, data, commands, programs, and/or any other suitable information.

Diagnostic system 320 is an illustrative example of one implementation of diagnostic system 118 in FIG. 1. In this illustrative example, diagnostic system 320 is implemented on mobile utility vehicle 300 as a component of machine controller 302. Diagnostic system 320 identifies pest problems and generates treatment plans to address the pest problems.

Diagnostic system 320 includes mission planner 328, plurality of databases 320, and user interface 332. Mission planner 328 may include software for generating treatment plan 334. Treatment plan 334 may be used by machine controller 302 to generate plans for treatment of pest problems, such as applying chemicals to treat a plant problem or pesticides to treat an insect problem, for example.

Machine controller 402 may execute processes using control software 326 to control propulsion system 304, steering system 306, and braking system 308 to control movement of mobile utility vehicle 300. Machine controller 302 may also use control software 326 to coordinate the movements of each mobile utility vehicle receiving commands from machine controller 302. Machine controller 302 may execute processes using control software 326 to control resource application system 314 and sensor system 310. Machine controller 302 may execute processes using plurality of databases 330 to control tasks being performed by mobile utility vehicle 300, such as resource application by resource application system 314, for example.

Machine controller 302 may send various commands to these components to operate the mobile utility vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions. Machine controller 302 may be a single processing unit, two processing units, or distributed across a number of processing units. As used herein, a number refers to one or more processing units.

Download module 322 provides for updates of plurality of databases 330 through a control system or remote location, such as back office 106 in FIG. 1. Download module 322 may also provide mobile utility vehicle 300 access to treatment plans, and other information located at a remote location, such as back office 106 in FIG. 1.

Plurality of databases 330 contains information about the operating environment, pest problems, and pest treatment options, among other information. Information about the operating environment may include information, such as, for example, a fixed map showing the landscape, structures, tree locations, flowerbed locations, individual plant locations, and other static object locations. Information about pest problems may include information, such as, for example, pest species and pest varieties. Information about pest treatment options may include information such as, for example, types of chemicals or other resources used to treat particular types of pest problems, treatment options available to the particular operating environment, and other environmental impact information.

Plurality of databases 330 may also contain information, such as, without limitation, plant species and varieties located in the operating environment, information about the water needs, growth stages, and life cycles of the plant species and varieties located in the operating environment, current weather for the operating environment, weather history for the operating environment, specific environmental features of the operating environment that affect mobile utility vehicle 300, animal species native to and/or common to the operating environment, and/or any other suitable information for management of pest problems. The information in plurality of databases 330 may be used to perform classification of pest problems, identify anomalies, diagnose pest problems, and plan actions for treatment of pest problems. Plurality of databases 330 may be located entirely in mobile utility vehicle 300 or parts or all of plurality of databases 330 may be located in a remote location, such as back office 106 in FIG. 1, which is accessed by mobile utility vehicle 300.

User interface 332 may be, in one illustrative embodiment, presented on a display monitor mounted on a side of mobile utility vehicle 300 and viewable by an operator. User interface 332 may display sensor data from the environment surrounding mobile utility vehicle 300, as well as messages, alerts, and queries for the operator. In other illustrative embodiments, user interface 332 may be presented on a remote display held by an operator or located in a remote location, such as back office 106 in FIG. 1.

In these examples, propulsion system 304 may propel or move mobile utility vehicle 300 in response to commands from machine controller 302. Propulsion system 304 may maintain or increase the speed at which a mobile utility vehicle moves in response to instructions received from machine controller 302. Propulsion system 304 may be an electrically controlled propulsion system. Propulsion system 304 may be, for example, an internal combustion engine, an internal combustion engine/electric hybrid system, an electric engine, or some other suitable propulsion system.

Steering system 306 may control the direction or steering of mobile utility vehicle 300 in response to commands received from machine controller 302. Steering system 306 may be, for example, an electrically controlled hydraulic steering system, an electrically driven rack and pinion steering system, an Ackerman steering system, a skid-steer steering system, a differential steering system, or some other suitable steering system.

Braking system 308 may slow down and/or stop mobile utility vehicle 300 in response to commands from machine controller 302. Braking system 308 may be an electrically controlled braking system. This braking system may be, for example, a hydraulic braking system, a friction braking system, or some other suitable braking system that may be electrically controlled.

Resource application system 314 is an example of one type of system that may be located on mobile utility vehicle 300 for executing a pest treatment plan, such as applying chemicals to treat an identified plant problem or applying pesticides to address an identified insect problem. Resource application system 314 enables mobile utility vehicle 300 to apply a resource, such as a chemical, to a number of surfaces. For example, the number of surfaces may be a plurality of individual plants, such as individual plants 112, 114, and 116 in FIG. 1, or an area, such as area 108 in FIG. 1. Resource application system 314 includes applicator 338. Applicator 338 may be any type of component or device configured to apply a resource to address a pest problem. Applicator 338 may include, for example, without limitation, a hose, nozzle, pump, sprayer, tubing, wiper, cloth, roller, laser, electromagnetic wave generator, light emitter, mister, fogger, duster, atomizer, gas stream, mechanical finger, and/or any other suitable applicator. Applicator 338 may include number of valves 340 for starting and stopping the flow of a resource, in one illustrative embodiment. If a pest problem is mosquitos, for example, one or more resources may be applied using different applicators. In this example, a first chemical may be applied to water in a garden pond to kill mosquito larva, while a second chemical is sprayed into the air to repel adult mosquitos, for instance. Additionally, a third chemical may be applied to the skin and clothing surfaces associated with a human to repel adult mosquitos, in this illustrative example.

Cartridge receptor 316 is an illustrative example of a type of resource storage system used by mobile utility vehicle 300. Cartridge receptor 316 is configured to receive and secure number of cartridges 342. Number of cartridges 342 is an illustrative example of one implementation of number of cartridges 128 in FIG. 1. Number of cartridges 342 includes number of resource reservoirs 344 and number of resources 346. Each cartridge may include one or more partitioned resource reservoirs containing one or more resources. The resources within the one or more resource reservoirs of a cartridge may be homogenous and/or heterogeneous.

Mission planner 328 generates treatment plan 334, which addresses the pest problem identified consistent with a number of applicable regulations. Applicable regulations may include, for example, without limitation, government regulations on the use of particular chemicals or resources, pesticide manufacturer guidelines, homeowner constraints and preferences, and/or any other suitable guideline or regulation. To ensure correct application of the type and amount of a resource to a number of surfaces or area, number of cartridges 342 include number of cartridge content identifiers 347.

Number of cartridge content identifiers 347 may be any type of identification means associated with number of cartridges 342 and configured to identify the contents of the resource or chemical within a cartridge, for example. Number of cartridge content identifiers 347 may be, for example, without limitation, a radio frequency identification tag, a bar code, a serial number, and/or any other suitable identifier. In an illustrative example, an RFID tag may encode the contents of a tamper-proof cartridge, the date of manufacture, an expiration date for the contents, and other suitable information. This information can be used to ensure application of the correct resource, and prevent application of an expired resource, for example.

In the illustrative example of an RFID tag, number of cartridge content identifiers 347 may be authenticated by decrypting an encrypted identifier using a key provided by mission planner 328, for example. In another illustrative example, cartridge receptor 316 may include identification reader 341, such as an RFID reader for example, configured to read and/or decrypt number of cartridge content identifiers 347. This provides authentication capabilities that ensure that the cartridge and its contents are from a valid source and contain contents appropriate for application according to treatment plan 334.

Number of cartridges 342 may also include flow/level meter 348. Flow/level meter 348 monitors the amount of a resource in number of reservoirs 344 and the amount of a resource applied at a particular location.

In an illustrative embodiment, flow/level meter 348 may be, for example, a float in number of reservoirs 344. The vertical position of the float may be representative of the amount of resource in number of reservoirs 344. In an illustrative embodiment, the float may be a sensor that tracks the change of resource level over time, and transmits the sensor data to a processing system, such as machine controller 302. In another illustrative embodiment, flow/level meter 348 may be a device for measuring the flow rate of a resource as the resource passes from number of reservoirs 344 through resource application system 314.

The amount of a resource to be applied, such as a chemical, is specified by a treatment plan. The actual resource applied may be estimated from resource application system 314 activity or measured using a fluid flow sensor, such as flow/level meter 348 in number of cartridges 342.

Sensor system 310 is a high integrity perception system and may be a set of sensors used to collect information about the environment around a mobile utility vehicle. In these examples, the information is sent to machine controller 302 to provide data in identifying how mobile utility vehicle 300 should manage resource application for pest problem resolution, such as providing data about the plurality of plants and/or current conditions in the operating environment, such as area 108 in FIG. 1. In these examples, a set refers to one or more items. A set of sensors is one or more sensors in these examples.

Communication unit 312 provides communications links and channels to machine controller 302 to receive information. The communication links and channels may be heterogeneous and/or homogeneous redundant components that provide fail-safe communication. This information includes, for example, data, commands, and/or instructions.

Communication unit 312 may take various forms. For example, communication unit 312 may include a wireless communications system, such as a cellular phone system, a Wi-Fi wireless system, a Bluetooth wireless system, and/or some other suitable wireless communications system. Further, communication unit 312 also may include a communications port, such as, for example, a universal serial bus port, a serial interface, a parallel port interface, a network interface, and/or some other suitable port to provide a physical communications link. Communication unit 312 may be used to communicate with a remote location, such as back office 106 in FIG. 1, or an operator.

Data storage device 318 is one example of persistent storage 208 in FIG. 2. Data storage device 318 may includes treatment plan 350. Treatment plan 350 may be generated by diagnostic system 320 and stored in data storage device 318, or may be received from a remote location via download module 322.

The illustration of mobile utility vehicle 300 in FIG. 3 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software.

For example, in some illustrative embodiment, mobile utility vehicle 300 may contain additional systems in place of or in addition to the systems depicted. For example, other systems may include, without limitation, pruning systems, cultivation systems, planting systems, and/or any other suitable system for executing horticultural tasks. Mobile utility vehicle 300 may be a general purpose mobile utility vehicle or a dedicated mobile utility vehicle. A general purpose mobile utility vehicle may have one or more interchangeable systems. A dedicated mobile utility vehicle may have one or more fixed systems.

Figure 4:
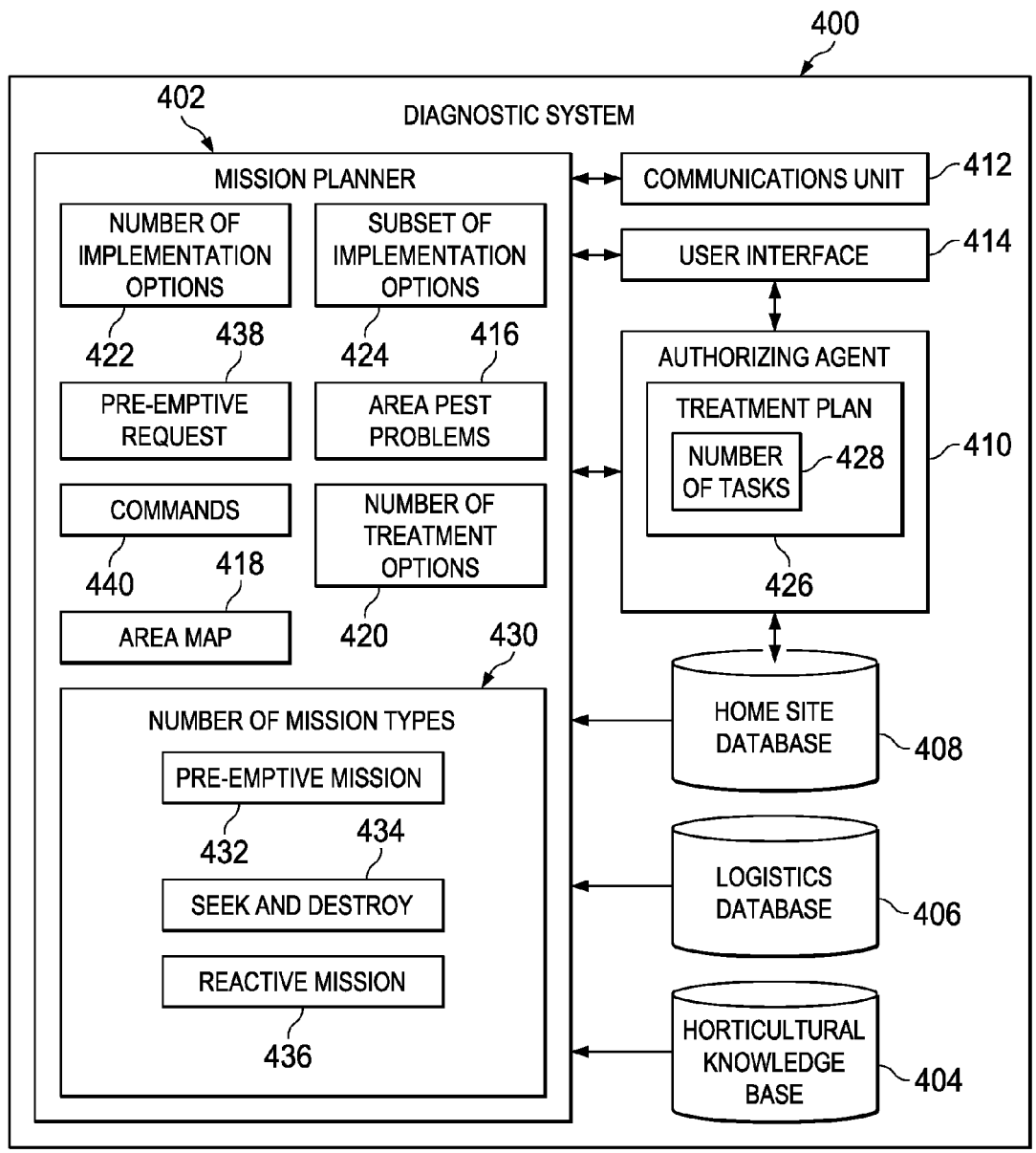
FIG. 4 is a block diagram of a diagnostic system in accordance with an illustrative embodiment.

With reference now to FIG. 4, a block diagram of a diagnostic system is depicted in accordance with an illustrative embodiment. Diagnostic system 400 is an example of one implementation of diagnostic system 118 FIG. 1 and/or diagnostic system 320 in FIG. 3.

Diagnostic system 400 may be a combination of hardware and software elements, which include mission planner 402, horticultural knowledge base 404, logistics database 406, home site database 408, authorizing agent 410, communications unit 412, and user interface 414. Mission planner 402 is an illustrative example of one implementation of data processing system 200 in FIG. 2. Mission planner 402 identifies pest problems using information about plants and/or given areas, identifies a number of diagnoses and treatment options for the need using a number of databases, and generates a preferred set of treatment implementation options to authorizing agent 410 using the number of databases. The information about plants and/or given areas may be, for example, without limitation, images, audio data, textual data, and/or any other suitable information.

Mission planner 402 may receive area pest problems 416. Area pest problems 416 may be received from a mobile utility vehicle associated with diagnostic system 400 during one or more of information gathering by the mobile utility vehicle, a user over user interface 414, or from a remote location, such as back office 106 in FIG. 1. Area pest problems 416 include information about a specific area, such as area 108 in FIG. 1, and an identified pest problem associated with the specific area. Area map 418 may be retrieved from home site database 408 and used by resolution manager 402 along with area pest problems 416 to determine number of treatment options 420, in this illustrative example.

Mission planner 402 uses area pest problems 416, horticultural knowledge base 404, and logistics database 406 to identify number of treatment options 420. Horticultural knowledge base 404 includes, without limitation, information about a number of different pest varieties. Logistics database 406 includes, without limitation, information about a number of pest problem treatment options. Number of treatment options 420 is one or more treatment options identified as associated with area pest problems 416.

Mission planner 402 processes number of treatment options 420 against logistics database 406 to generate number of implementation options 422. Logistics database 406 contains information on the types of resources, resource applications, and associated monetary costs required for treatment of pest problems. Number of implementation options 422 is one or more options of how a pest problem can be treated, such as with what chemicals, by whom, and when, for example.

Mission planner 402 processes number of implementation options 422 against home site database 408 to generate subset of implementation options 424. Home site database 408 contains information specific to a location or area, such as a yard, garden, lawn, and the like. This information may be defined by an owner of the location or area, for example. Subset of implementation options 424 are possible treatment options that fit within pre-defined guidelines or parameters of the particular area to be treated. For example, the particular area may include pet inhabitants that would limit the types of possible chemical applications for that area. In another illustrative example, the particular area may include budgetary constraints that would limit the treatment options to comply with budgetary constraints.

Mission planner 402 sends subset of implementation options 424 to authorizing agent 410. In one illustrative example, authorizing agent 410 is a software agent authorized to make decisions on behalf of an owner, such as a home owner or area manager, for example. In another illustrative example, authorizing agent 410 is the owner communicating with mission planner 402 through user interface 414. Authorizing agent 410 uses subset of implementation options 424 to generate treatment plan 426. Treatment plan 426 is a plan to address a pest problem that is selected for execution by a mobile utility vehicle. Treatment plan 426 may include number of tasks 428. Number of tasks 428 may include, for example, without limitation, ordering a required resource, associating the required resource with a mobile utility vehicle, applying the required resource, storing remaining resource, disposing of remaining resource, and/or any other suitable task. Treatment plan 426 may also include information such as, without limitation, an amount of resource to be applied, the manner in which to apply the resource, the time at which the resource is to be applied, and the location the resource is to be applied.

Communications unit 412 is an illustrative example of one implementation of communications unit 210 in FIG. 2. In an illustrative example, where diagnostic system 400 is implemented at a location remote from a mobile utility vehicle, authorizing agent 410 may use communications unit 412 to transmit treatment plan 426 to a mobile utility vehicle.

User interface 414 may include a display device, such as display 214 in FIG. 2, to display treatment plan 426 to a user, such as user 124 in FIG. 1, for example. In another illustrative example, user interface 414 may include a number of peripheral devices, such as a keyboard and mouse, to allow a user to interact with resolution manger 402.

Mission planner 402 may be configured to generate number of mission types 430. Number of mission types 430 illustrates the broad categories of mission types that mission planner 402 may employ to generate implementation options for authorizing agent 410, for example. Number of mission types 430 may include pre-emptive mission 432, seek and destroy 434, and reactive mission 436. Pre-emptive mission 432 is a mission in which mission planner 402 responds to pre-emptive request 438 in generating implementation options prior to an actual pest problem being detected or identified.

For example, pre-emptive request 438 may be received from a user via user interface 414 requesting that a particular type of pest problem, such as mosquitos for example, be pre-emptively addressed prior to a specific time or date for a given area, in an illustrative example. In this illustrative example, mission planner 402 receives pre-emptive request 438 and generates pre-emptive mission 432 to identify number of treatment options 420 that will address the pest problem pre-emptively. An illustrative example may be to apply a citronella oil to the given area prior to the specific time identified in pre-emptive request 438 so that a mosquito problem is prevented from developing. In another illustrative example, pre-emptive request 438 may be generated by authorizing agent 410 based on a scheduled event stored in home site database 408, for example. In this illustrative example, authorizing agent 410 may access home site database 408 to identify an area schedule for the given area, and pre-emptively address potential pest problems for specific events, such as an outdoor barbeque, for example.

Seek and destroy 434 is a mission in which mission planner 402 identifies a characteristic of a pest and eliminates any detected characteristic for the given area. In an illustrative example, mission planner 402 may receive a request to eliminate a particular sound, such as the buzzing of a mosquito. Mission planner 402 generates commands 440 for a mobile utility vehicle to seek out the particular sound identified using a sensor system and destroy the particular sound. The implementation options used to generate the treatment plan may correspond to a specific treatment plan for the type of pest being sought out using the particular sound, for example.

Reactive mission 436 is a mission where area pest problems 416 is received, identifying the particular pest problem to be addressed, as discussed above.

The illustration of diagnostic system 400 in FIG. 4 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software.

For example, in some advantageous embodiments, one or more of horticultural knowledge base 404, logistics database 406, and home site database 408 may be located in whole or in part at a location remote from diagnostic system 400 and accessible to mission planner 402 using communications unit 412.

Figure 5:
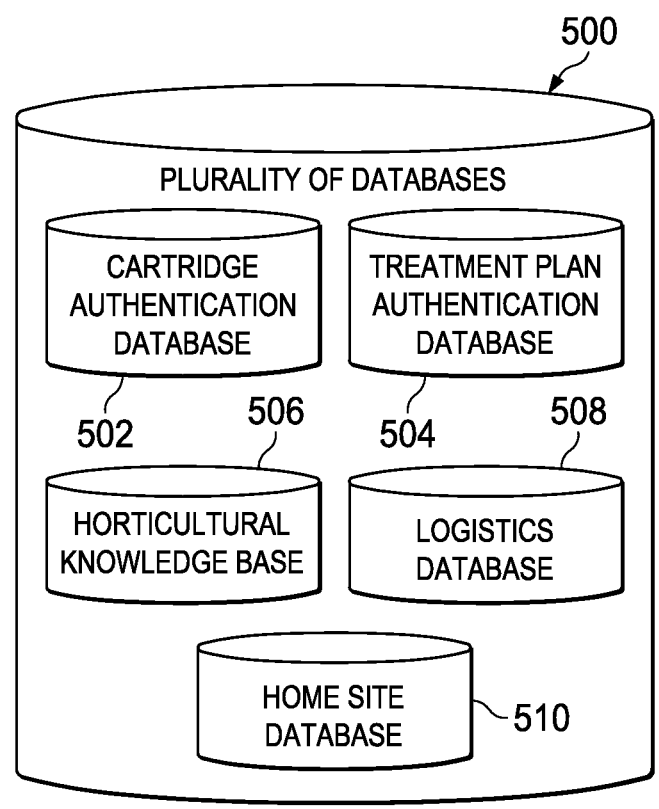
FIG. 5 is a block diagram of a plurality of databases in accordance with an illustrative embodiment.

With reference now to FIG. 5, a block diagram of a plurality of databases is depicted in accordance with an illustrative embodiment. Plurality of databases 500 may be located in a mobile utility vehicle, such as mobile utility vehicle 104 in FIG. 1 and mobile utility vehicle 300 in FIG. 3, or distributed across both a remote location and a mobile utility vehicle.

Plurality of databases 500 includes cartridge authentication database 502, treatment plan authentication database 504, horticultural knowledge base 506, logistics database 508, and home site database 510. Cartridge authentication database 502 contains information about the type of cartridge receptor associated with a particular mobile utility vehicle and the corresponding cartridges that are compatible with each type of cartridge receptor. Treatment plan authentication database 504 contains information about the authoritative sources authorized to generate treatment plans for a particular mobile utility vehicle and/or a specific location or area.

An authenticator of a mobile utility vehicle, such as authenticator 324 in FIG. 3, may access cartridge authentication database 502 and treatment plan authentication database 504 to authenticate number of cartridges 342 and/or treatment plan 350 in FIG. 3, for example.

Horticultural knowledge base 506 includes, without limitation, information about a number of different pest varieties. Logistics database 508 includes, without limitation, information about a number of pest problem treatment options. Home site database 510 includes, without limitation, information about a given area and owner configured variables for treatment of pest problems in the given area.

Figure 6:
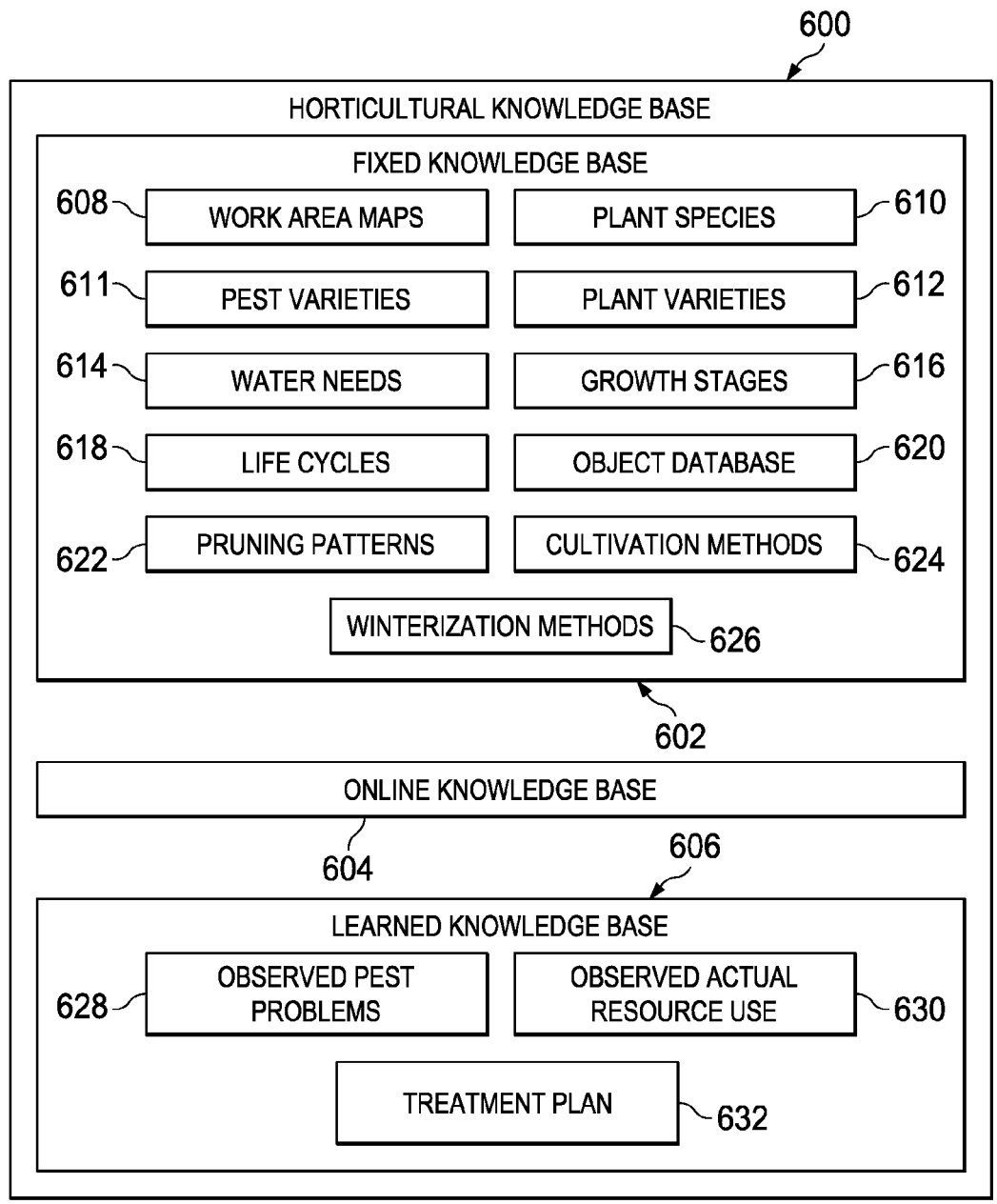
FIG. 6 is a block diagram of a horticultural knowledge base in accordance with an illustrative embodiment.

With reference now to FIG. 6, a block diagram of a horticultural knowledge base is depicted in accordance with an illustrative embodiment. Horticultural knowledge base 600 is an example of a knowledge base component of a diagnostic system, such as horticultural knowledge base 330 of mobile utility vehicle 300 in FIG. 3. For example, horticultural knowledge base 600 may be, without limitation, a component of a navigation system, an autonomous machine controller, a semi-autonomous machine controller, or may be used to make horticultural management decisions regarding operating environment activities and coordination activities.

Horticultural knowledge base 600 includes fixed knowledge base 602, online knowledge based 604, and learned knowledge base 606.

Fixed knowledge base 602 contains static information about the operating environment of a mobile utility vehicle. Fixed knowledge base 602 includes work area maps 608, plant species 610, plant varieties 612, water needs 614, growth stages 616, life cycles 618, object database 620, pruning patterns 622, cultivation methods 624, and winterization methods 626. Work area maps 608 contains information about the operating environment of a mobile utility vehicle such as, without limitation, a fixed map showing the landscape, structures, tree locations, flowerbed locations, individual plant locations, and other static object locations.

Plant species 610 contains information about the characteristics of various plant species. For example, characteristics of various plant species may be, without limitation, trunk, bark, branching system, stem size, leaf pattern, budding, non-budding, color, growth pattern, preferred sunlight, preferred soil moisture, preferred soil pH, and the like. Pest varieties 611 contains information about a number of different types of pests and the characteristics of these pests. For example, characteristics of pest species may be, without limitation, visual appearance, sound, native habitats, seasonal indicators, life cycles, and the like. As used herein, pest may refer to an insect, reptile, mammal, bird, vertebrate animal, invertebrate animal, fungi, single celled organism, bacteria, plant, and/or any other suitable pest. For example, in some areas deer may be considered pests, while in other areas pigeons may be considered pests. In yet another example, dandelions may be considered a pest in a cultivated garden.

Plant varieties 612 contain information about the characteristics of the different plant varieties or cultivars of the various plant species found in plant species 610. For example, characteristics of different plant varieties or cultivars of the various plant species may be, without limitation, color, size, growth pattern, budding pattern, preferred sunlight, preferred soil moisture, preferred soil pH, and the like. A cultivar is a cultivated plant that has been selected and given a unique name because of its decorative or useful characteristics. A cultivar is usually distinct from similar plants and when propagated it retains those characteristics.

In an illustrative embodiment, some examples of various characteristics of preferred soil moisture may be, without limitation, more water than average rainfall for the year, more water during growth stage, no water during dormancy period, well-drained soil, and the like. In another illustrative embodiment, some examples of various characteristics of color and size may be, without limitation, green leaves with white margins, green leaves with irregular wide light yellow margins, chartreuse to gold leaves with dark green margins, dark blue leaves with yellow shades, large leaves chartreuse to gold, green leaves with wide gold centers and white streaks between, and the like.

Water needs 614 contains information about the typical water needs associated with each plant species and plant variety or cultivar found in plant species 610 and plant varieties 612, according to the growth stage and life cycle of the plant. Growth stages 616 contains information about the typical growth stages, or expected growth stages, associated with each plant species and plant variety found in plant species 610 and plant varieties 612. Expected growth stages may be, for example, the growth height, bloom, flowering, and/or any other suitable growth stage indicator used for determining the developmental stage of a particular plant. Life cycles 618 contains information about the typical life cycles associated with each plant species and plant variety found in plant species 610 and plant varieties 612. For example, life cycles 618 may indicate whether a particular plant species or variety is an annual or a perennial. Perennials, especially small flowering plants, grow and bloom over the spring and summer die back every autumn and winter, then return in the spring from their root-stock. Annuals will typically germinate, flower, and die within one year, unless they are prevented from setting seed. Some seedless plants can also be considered annuals even though they do not flower. The life cycle of an individual plant varies and depends upon the point in the growing season as well as the type of plant species and variety.

Object database 620 contains fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "tree trunk." Fixed knowledge base 602 may contain further fixed operating environment information. Fixed knowledge base 602 may be updated based on information from learned knowledge base 606.

Pruning patterns 622 contains information about how to prune a particular plant variety and/or species. Pruning patterns 622 may include a heading back cut, a thinning out cut, a topping off cut, deadheading, and/or any other suitable pruning method. A heading back cut is a pruning pattern that cuts back to an intermediate point of growth. A thinning out cut is a pruning pattern that cuts back to some point of origin, such as removal of an entire shoot, limb, or branch at its point of origin on the plant. A topping off cut is a pruning pattern that involves removing all branches and growths down to a few large branches or to the trunk of the tree. Deadheading is a pruning pattern that removes spent flowers or flower heads for aesthetics, to prolong bloom for up to several weeks or promote re-bloom, or to prevent seeding.

Cultivation methods 624 contains information about how to cultivate a particular plant variety and/or species. Cultivation methods 624 may include information on how to perform certain tasks, such as, without limitation tilling or working the soil, removing weeds, harvesting plants, and/or any other suitable cultivation task. Different methods for tilling or working the soil may include, without limitation, turning the soil, aerating the soil, and/or any other suitable method of working the soil. For example, working the soil may be necessary when the soil becomes hardened, such as when soil receives moisture and then dries rapidly forming a hardened crust which prevents further moisture from penetrating the soil to reach the plant roots. Cultivation methods 624 may also take into account the root depth of a particular plant when providing appropriate methods for a particular plant variety or species. For example, a plant with shallow roots may require a passive tool for working the soil, such as a hoe, while a plant with a deep root system may allow for the use of an active tool for working the soil, such as a rotor till.

Different methods for removing weeds may include, without limitation, physical methods, chemical methods, and/or any other suitable method for removing weeds. For example, physical methods may include ploughing to cut the roots of the weeds or pulling the weeds up from the soil. Chemical methods may include distributing herbicides across the area in which weeds are growing. Different methods for harvesting may include, without limitation, reaping, picking, cutting, or otherwise removing mature crops, fruit, vegetables, flowers, and/or any other plant yield.

Winterization methods 626 contains information about how to winterize a particular plant variety and/or species. Winterization methods 626 may include methods such as, without limitation, pruning old growth, adding organic matter, blanketing dormant plants for insulation, and/or any other suitable winterization method. For example, blanketing dormant plants may include using shredded leaves, straw, or other suitable organic material to cover the plant to a certain depth, such as insulating a plant with two feet of shredded leaves.

Online knowledge base 604 may be accessed with a communications unit, such as communications unit 312 in FIG. 3, to wirelessly access the Internet. Online knowledge base 604 dynamically provides information to a machine control process which enables adjustment to sensor data processing, site-specific sensor accuracy calculations, and/or exclusion of sensor information. For example, online knowledge base 604 may include current weather conditions of the operating environment from an online source. In some examples, online knowledge base 604 may be a remotely accessed knowledge base. This weather information may be used by control software 326 in machine controller 302 in FIG. 3 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress.

Learned knowledge base 606 may be a separate component of horticultural knowledge base 600, or alternatively may be integrated with fixed knowledge base 602 in an illustrative embodiment. Learned knowledge base 606 contains knowledge learned as the mobile utility vehicle spends more time in a specific work area, and may change temporarily or long-term depending upon interactions with online knowledge base 604 and user input. Learned knowledge base includes observed pest problems 628, observed actual resource use 630, and treatment plan 632. Observed pest problems 628 contains information collected by a sensor system, such as sensor system 310 in FIG. 3, detecting the actual pest problems of a given area, such as area 108 in FIG. 1. Observed actual resource use 630 contains information collected by a sensor system about the actual amount of resource applied in treatment of pest problems. Observed actual resource use 630 is learned information about the actual resource applied to an individual plant or given area that can be used by a processing system, such as diagnostic system 320 in machine controller 302 in FIG. 3, to adjust or maintain the amount of resource applied in future treatment applications.

Treatment plan 632 contains information about the amount of resources that should be applied to an area, such as area 108 in FIG. 1, and/or each individual plant, such as individual plants 112, 114, and 116 in FIG. 1. Resources may be, for example, without limitation, water, chemicals, fertilizer, herbicide, pesticide, plant food, pesticide, and the like. In one illustrative embodiment, treatment plan 632 is transmitted to a mobile utility vehicle, such as mobile utility vehicle 300 in FIG. 3, either through download module 322 or communications unit 312 in FIG. 3. In another illustrative embodiment, treatment plan 632 is calculated by a processing system, such as diagnostic system 320 in FIG. 3, using the learned data from observed pest problems 628 and observed actual resource use 630, as well as the fixed data from fixed knowledge base 602. A mobile utility vehicle, such as mobile utility vehicle 300 in FIG. 3, fulfills treatment plan 632 by moving within the operating environment to collect resources from a resource source, such as home location 136 in FIG. 1, and apply the resource to a given area, such as area 108 in FIG. 1. Treatment plan 632 may be instructions for applying a specific amount of a resource or resources to an area. In these examples, treatment plan 632 may be directed to an area, such as area 108 in FIG. 1, or may be directed to a plurality of plants, such as plurality of plants 110 in FIG. 1.

In another illustrative example, learned knowledge base 606 may detect the absence of a tree that was present the last time it received environmental data from the work area. Learned knowledge base 606 may temporarily change the environmental data associated with the work area to reflect the new absence of a tree, which may later be permanently changed upon user input confirming the tree was in fact cut down. Learned knowledge base 606 may learn through supervised or unsupervised learning.

The information in horticultural knowledge base 600 may be used to identify pest problems and plan actions for treatment of pest problems. Horticultural knowledge base 600 may be located entirely in a mobile utility vehicle, such as mobile utility vehicle 300 in FIG. 3, or parts or all of horticultural knowledge base 600 may be located in a remote location, such as back office 106 in FIG. 1, which is accessed by a mobile utility vehicle.

Figure 7:
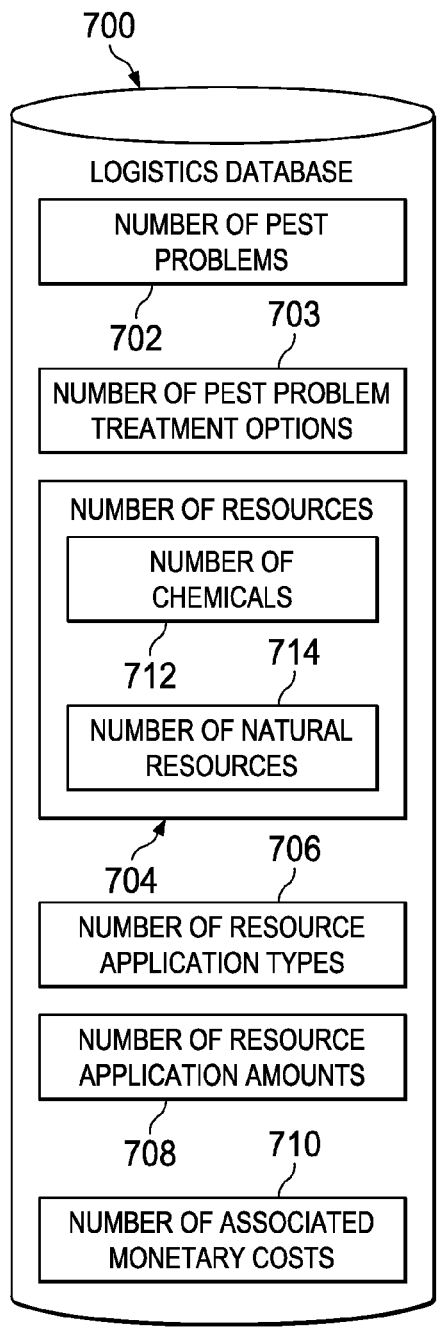
FIG. 7 is a block diagram of a logistics database in accordance with an illustrative embodiment.

With reference now to FIG. 7, a block diagram of a logistics database is depicted in accordance with an illustrative embodiment. Logistics database 700 is an illustrative example of one implementation of logistics database 406 in FIG. 4.

Logistics database 700 includes information about the resources, resource application, and cost of addressing different plant problems. Logistics database 700 may include, for example, without limitation, number of pest problems 702, number of pest problem treatment options 703, number of resources 704, number of resource application types 706, number of resource application amounts 708, and number of associated monetary costs 710.

Number of pest problems 702 contains information about a number of different problems associated with pests and/or a given area. For example, number of pest problems 702 may include plant health issues, human issues, environmental issues, and/or any other issue involving a pest or number of pests. Plant health issues may be, for example, without limitation, caterpillars eating through the leaves of a plant. Human issues may be, for example, without limitation, mosquitos in a backyard area. Number of pest problem treatment options 703 contains information about a number of different treatment options associated with a number of different pests identified in number of pest problems 702. For example, number of pest problem treatment options 703 may include application of a chemical to a given area. Number of resources 704 contains information on a number of different resources associated with treatment of number of pest problems 702. Number of resources 704 may include identification of number of chemicals 712 and number of natural resources 714, for example. Each resource in number of resources 704 may be associated with one or more pest problems in number of pest problems 702.

Number of resource application types 706 contains information about types of applications available for given resources. Each application type in number of resource application types 706 may be associated with one or more resources form number of resources 704. Number of resource application amounts 708 contains information about the amount of a given resource associated with treatment of a given pest problem. Number of associated monetary costs 710 contains information about the monetary costs associated with each of number of resources 704, number of resource application types 706, and number of resource application amounts 708.

Figure 8:
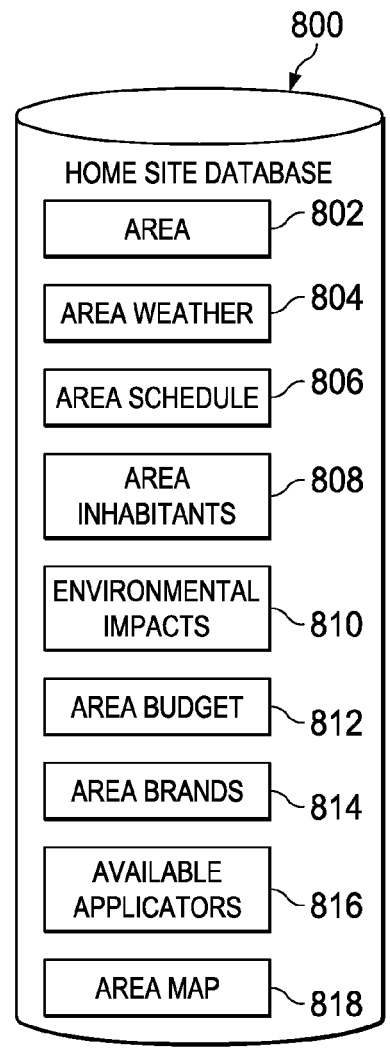
FIG. 8 is a block diagram of a home site database in accordance with an illustrative embodiment.

With reference now to FIG. 8, a block diagram of a home site database is depicted in accordance with an illustrative embodiment. Home site database 800 is an example of one implementation of home site database 408 in FIG. 4.

Home site database 800 contains information specific to a given area or location. The information in home site database 800 may be defined by an owner of the given area or location, for example, such as a home owner or property manager.

Home site database 800 is associated with area 802 in this illustrative example. Home site database 800 includes area weather 804, area schedule 806, area inhabitants 808, environmental impacts 810, area budget 812, area brands 814, available applicators 816, and area map 818. Area weather 804 may include information about the current weather for area 802 and/or weather forecasts for area 802. Area weather 804 may be downloaded to home site database 800 using a processing system, such as diagnostic system 400, in one illustrative embodiment. In another illustrative embodiment, area weather 804 may be obtained with online access to the Internet using a communications unit, such as communications unit 412 in FIG. 4.

Area schedule 806 contains information about scheduled events and/or use of area 802. In an illustrative example, area schedule 806 may include, without limitation, dates and times when the area is occupied, dates and times when the area is unoccupied, dates and times when the area is occupied by humans, dates and times when the area is occupied by pets, dates and times when the area is occupied by children, dates and times when resource application is prohibited, dates and times when resource application is preferred, and the like. For example, a social gathering may be scheduled for a Wednesday evening, and an insecticide application may be desired for a time leading up to that event but not during the event when humans will occupy the area.

Area inhabitants 808 contain information about the anticipated or expected human and/or animal inhabitants of area 802. For example, area inhabitants 808 may contain information about the type of pets who frequent area 808, such as cats or dogs. Environmental impacts 810 contains information about the environmental impact to area 802 associated with a given resource application.

Area budget 812 contains information about the pre-defined monetary expenditure constraints placed on resource application to area 802. For example, area budget 812 may include a monthly budgetary allotment that a treatment plan must fall within to be acceptable for application to area 802. Area brands 814 contains information about pre-defined product brands, preferred applicators, chemical handling guidelines, and other parameters defined by an owner for treatment plans to area 802.

Available applicators 816 contain information about the application means available to area 802. Available applicators 816 may include, for example, without limitation, a mobile utility vehicle, special manual equipment, a preferred service, and/or any other suitable applicator.

Area map 818 may be a map of an operating environment, such as area 108 in FIG. 1. Area map 818 may be predefined by a user, such as user 124 in FIG. 1, in one illustrative example. In another illustrative example, area map 818 may be generated by a mobile utility vehicle, such as mobile utility vehicle 104 in FIG. 1, during information gathering in an area.

Figure 9:
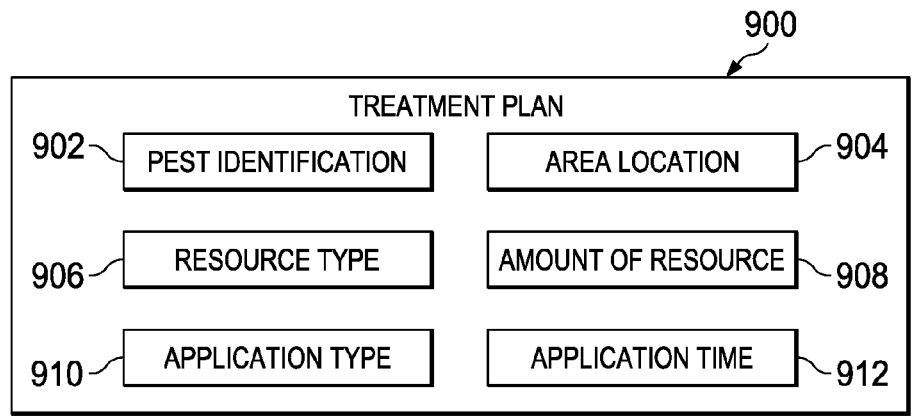
FIG. 9 is a block diagram of a treatment plan in accordance with an illustrative embodiment.

With reference now to FIG. 9, a block diagram of a treatment plan is depicted in accordance with an illustrative embodiment. Treatment plan 900 is an example of one implementation of treatment plan 350 in FIG. 3.

Treatment plan 900 contains information about the amount of a resource or resources that should be applied to a given area, such as area 108 in FIG. 1. Treatment plan 900 may be instructions for applying a specific amount of a resource or resources to an area or sub-locations of an area. In these examples, treatment plan 900 may be directed to an individual area, such as area 108 in FIG. 1, or may be directed to a plurality of plants, such as plurality of plants 110 within area 108 in FIG. 1.

As illustrated, treatment plan 900 includes, for example, pest identification 902, area location 904, resource type 906, amount of resource 908, application type 910, and application time 912. These different components of treatment plan 900 are used to identify the area to be treated as well as the amount of resource to be applied to that area, the type of application for the resource, and when the resource is to be applied.

Pest identification 902 includes information identifying the species and variety of a number of individual pests presenting the pest problem to the area. The information in pest identification 902 is obtained using components of a fixed knowledge base, such as pest varieties 611 of fixed knowledge base 602 in FIG. 6, as well as a sensor system, such as sensor system 310 in FIG. 3. In another illustrative embodiment, the information in pest identification 902 may be obtained from a user through a user interface.

Area location 904 includes information about the location of an area or sub-areas. For example, area location 904 may contain information about the location of a number of sub-locations within the area, information about the location of a group of plants within the area, such as plurality of plants 110 in FIG. 1, and/or information about the location of an area with a plurality of plants, such as area 108 in FIG. 1.

Resource type 906 identifies the resource or resources to be applied to the area identified. Amount of resource 908 is the amount of resource required for application to an area or group of plants after a diagnostic system has determined treatment plan 900. Application type 910 includes information about the type of application and/or applicator to be used to apply the resource to the area or plant identified in treatment plan 900. Application time 912 contains information about the time required for application and/or the frequency of application for the resource identified.

In one illustrative embodiment, treatment plan 900 is transmitted to a mobile utility vehicle, such as mobile utility vehicle 300 in FIG. 3, either through download module 322 or communications unit 312 in FIG. 3. In another illustrative embodiment, treatment plan 900 is calculated by a processing system, such as diagnostic system 320 in machine controller 302 in FIG. 3.

Figure 10:
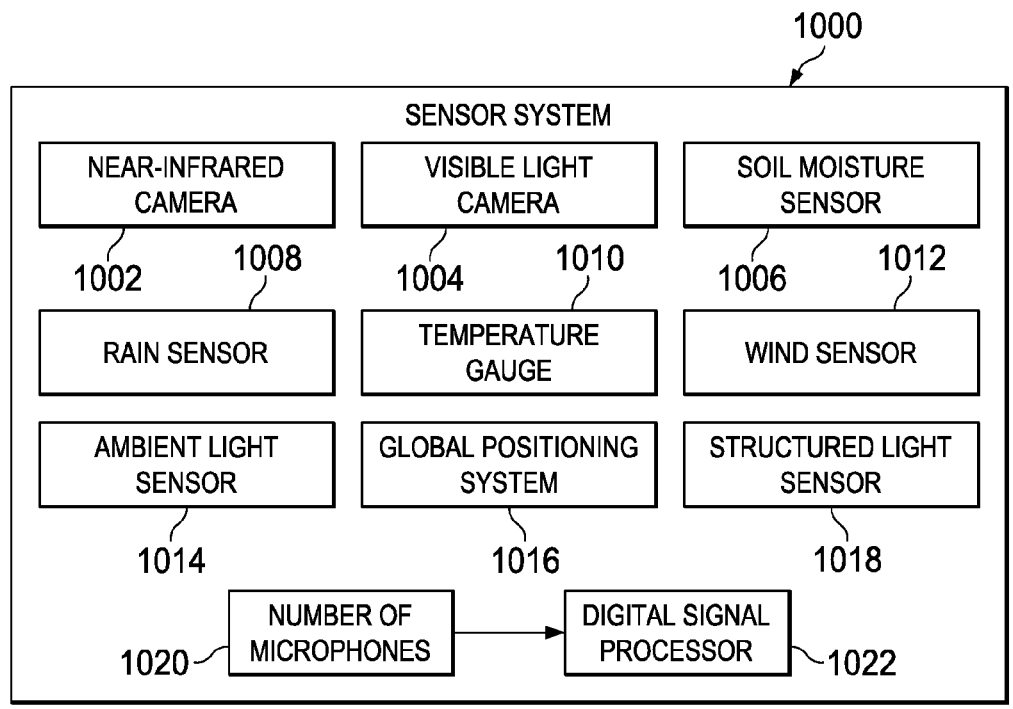
FIG. 10 is a block diagram of a sensor system in accordance with an illustrative embodiment.

With reference now to FIG. 10, a block diagram of a sensor system is depicted in accordance with an illustrative embodiment. Sensor system 1000 is an example of one implementation of sensor system 310 in FIG. 3.

As illustrated, sensor system 1000 includes, for example, infrared camera 1002, visible light camera 1004, soil moisture sensor 1006, rain sensor 1008, temperature gauge 1010, wind sensor 1012, ambient light sensor 1014, global positioning system 1016, structured light sensor 1018, number of microphones 1020, and digital signal processor 1022. These different sensors may be used to identify the operating environment around a mobile utility vehicle and to identify plant anomalies in a number of plants. The sensors in sensor system 1000 may be selected such that one of the sensors is always capable of sensing information needed to operate the mobile utility vehicle in different operating environments.

Near-infrared camera 1002 may form an image using infrared radiation. Visible light camera 1004 may be a standard still-image camera, which may be used alone for color information or with a second camera to generate stereoscopic, or three-dimensional, images. When visible light camera 1004 is used along with a second camera to generate stereoscopic images, the two or more cameras may be set with different exposure settings to provide improved performance over a range of lighting conditions. Visible light camera 1004 may also be a video camera that captures and records moving images.

The near-infrared images from near-infrared camera 1002 and visible light camera 1004 may be processed using means known in the art to identify plant species and assess plant health.

Soil moisture sensor 1006 detects the current in situ soil moisture information from specific portions of the operating environment.

Rain sensor 1008 detects precipitation on an exterior surface of the mobile utility vehicle. In one embodiment, rain sensor 1008 includes an infrared beam and an infrared sensor. In this illustrative example, rain sensor 1008 operates by beaming an infrared light at a 45-degree angle into a windshield of the mobile utility vehicle from the inside of the mobile utility vehicle. If the windshield is wet, less light makes it back to the sensor, indicating the presence of moisture on the windshield and the likelihood of rain. The illustrative embodiment is not meant to limit the architecture of rain sensor 1008. Other rain detection technologies may be used without departing from the spirit and scope of the invention.

Temperature gauge 1010 detects the ambient temperature of the operating environment. Wind sensor 1012 detects the wind speed in an operating environment. In an illustrative embodiment, temperature gauge 1010 and wind sensor 1012 are optional features of sensor system 1000. The information detected by temperature gauge 1010 and wind sensor 1012 may alternatively be received from an online knowledge base, such as online knowledge base 604 in FIG. 6. Ambient light sensor 1014 measures the amount of ambient light in the operating environment.

Global positioning system 1016 may identify the location of the mobile utility vehicle with respect to other objects in the environment. Global positioning system 1016 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation.

Structured light sensor 1018 emits light in a pattern, such as one or more lines, reads back the reflections of light through a camera, and interprets the reflections to detect and measure objects in the environment. Number of microphones 1020 captures sound and localizes the sound source, such as buzzing mosquitoes, in an illustrative example. Digital signal processor 1022 may receive the sound files or data from number of microphones 1020 and use signal processing techniques to identify the species of pest, for example.

In an illustrative embodiment, sensor system 1000 receives data from soil moisture sensor 1006 identifying the soil moisture of specific portions of the operating environment. The information about the soil moisture is processed by a processor, such as diagnostic system 320 in machine controller 302 in FIG. 3, and optionally displayed to an operator through user interface 414 in FIG. 4. In one illustrative example, user input may be received to adjust treatment plan for the individual plant or plants in the specific portion of the operating environment. The user input is then used by a control system, such as control software 326 in machine controller 302 in FIG. 3, to determine which commands to send to the mobile utility vehicle's resource application system.

Figure 11:
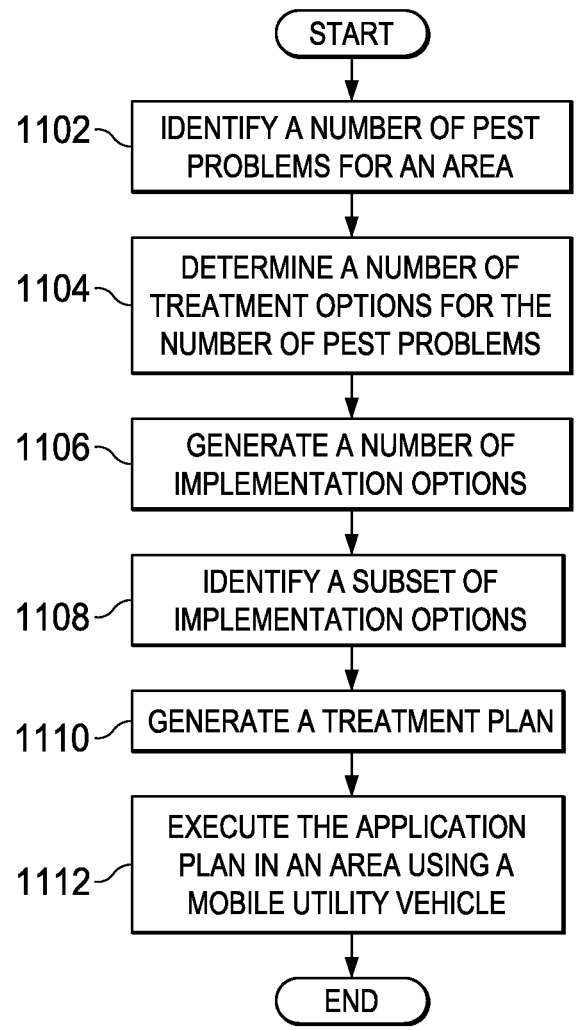
FIG. 11 is a flowchart illustrating a process for managing a plant problem in accordance with an illustrative embodiment.

With reference now to FIG. 11, a flowchart illustrating a process for managing a horticultural need is depicted in accordance with an illustrative embodiment. The process in FIG. 11 may be implemented by diagnostic system 320 and control software 326 in machine controller 302 in FIG. 3.

The process begins by identifying a number of pest problems for an area (step 1102). The number of pest problems may be, for example, an increase in mosquitoes for a residential yard. The number of pest problems may be detected using information captured by a sensor system, such as sensor system 310 in FIG. 3, for example. The pest problems detected may be identified using a plurality of databases, such as plurality of databases 330 in FIG. 3.

Next, the process determines a number of treatment options for the number of pest problems (step 1104). The treatment options may be determined using a logistics database, such as logistics database 700 in FIG. 7. The process then generates a number of implementation options (step 1106). The implementation options may be generated using a logistics database that contains corresponding pest problems and resources used to treat the pest problems, as well as the resource amounts, application types, and associated costs for the treatment options considered.

The process identifies a subset of implementation options (step 1108) for the number of pest problems identified. The subset of implementation options is a portion of the number of implementation options that is identified as applicable to a given area and/or location using a home site database. The home site database contains information on site-specific parameters used to filter the number of implementation options to result in the subset of implementation options.

Next, the process generates a treatment plan (step 1110), such as treatment plan 350 in FIG. 3. The treatment plan may be instructions for applying a specific amount of a resource or resources to an area at a given time and location.

The process then executes the treatment plan in an area using a mobile utility vehicle (step 1112), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments recognize a need for an automated means of dealing with pest problems, which reduces the human labor required to address the problems and reduces chemical handling and storage.

The illustrative embodiments recognize that current methods for identifying and resolving pest problems are a labor intensive task. When pest problems are addressed by a home owner, for example, the home owner must identify possible solutions to the problem, and implement the solutions manually. This implementation may involve contacting a professional lawn or gardening service, making a trip to a retailer for supplies, ordering chemicals, studying chemical application, performing the chemical application, cleaning up after the application, and then storing any unused chemicals. This current approach is time consuming and often results in leftover chemicals being stored and presenting potential safety hazards.

Therefore, the illustrative embodiments provide an autonomous horticultural resolution system that identifies pest problems, determines treatment plans, and applies the treatment to the area with the problem in order to resolve the issue detected.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An apparatus for performing horticultural tasks, the apparatus comprising:
a processor unit;
a first number of communication links from the processor unit to a plurality of databases stored on a number of data storage devices; and
a second number of communication links from the processor unit to a diagnostic system, the processor unit configured to execute the diagnostic system, access the plurality of databases on the number of data storage devices to identify a pest problem, generate a treatment plan to address the pest problem, identify required resources associated with the treatment plan, and determine whether the required resources are included within the apparatus.

2. The apparatus of claim 1, wherein the plurality of databases includes data about a number of pests, pest treatments, and information about a local area.

3. The apparatus of claim 1, wherein the processor unit is located remote from a mobile utility vehicle performing the treatment plan.

4. The apparatus of claim 1, wherein the processor unit is located on a mobile utility vehicle.

5. The apparatus of claim 1, wherein the number of data storage devices are distributed across a number of locations.

6. The apparatus of claim 1, wherein the diagnostic system further comprises:
a mission planner configured to generate a number of mission types used to generate the treatment plan.

7. A vehicle comprising:
a machine controller;
a steering system;
a propulsion system;
a link for receiving input from a number of sensors; and
a diagnostic system configured to identify pest problems, generate treatment plans to address the pest problems identified, identify required resources associated with the treatment plans, and determine whether the required resources are included within the vehicle,
wherein the machine controller is connected to the diagnostic system and wherein the machine controller uses the diagnostic system to identify the pest problem for an area.

8. The vehicle of claim 7, wherein the machine controller identifies the pest problem for the area using the diagnostic system and information obtained from the number of sensors on the vehicle.

9. The vehicle of claim 7, wherein the diagnostic system further comprises a plurality of databases having data about a number of pests, pest treatments, and a local area.

10. The vehicle of claim 7, wherein the machine controller receives data from a plurality of sensors for the vehicle to form received data and generates a treatment plan for the area using the received data and the diagnostic system.

11. The vehicle of claim 7, wherein the diagnostic system identifies at least one of a pest variety and an environmental condition around an area.

12. The vehicle of claim 7, wherein the number of sensors comprises at least one of a global positioning system, structured light sensor, infrared camera, visible light camera, soil moisture sensor, rain sensor, temperature gauge, wind sensor, ambient light sensor, microphone, and digital signal processor.

13. The vehicle of claim 7 further comprising:
a cartridge receptor configured to receive and secure a number of cartridges.

14. The vehicle of claim 13, wherein a cartridge contents identifier is received from the number of cartridges and compared to a cartridge contents identifier provided by the diagnostic system.

15. The vehicle of claim 13, wherein a cartridge contents identifier is received from the number of cartridges and authenticated by an authenticator of the machine controller.

16. The vehicle of claim 13 further comprising:
a resource application system configured to apply a number of resources from the number of cartridges to a number of surfaces.

17. The apparatus of claim 16, wherein the resource application system does not apply the number of resources if at least one of a cartridge contents identifier received from the number of cartridges is not the same as a cartridge contents identifier provided by the diagnostic system, and the cartridge contents identifier received fails authentication by an authenticator of the machine controller.

18. A system for managing horticultural needs, the system comprising:
a mission planner configured to receive information and analyze the information to identify a number of pest problems and a number of treatment options;
a horticultural knowledge base having information about a number of pests;
a logistics database having information about a number of pest treatments;
a home site database having information about a given area; and
an authorizing agent, wherein the authorizing agent receives a subset of implementation options from the mission planner and uses the subset of implementation options to generate treatment plan for treatment of the pest problems identified, identifies required resources associated with the treatment plans, and determines whether the required resources are included within the vehicle.

19. The system of claim 18, wherein the mission planner processes the number of treatment options against the logistics database to generate a number of implementation options.

20. The system of claim 18, wherein the mission planner processes the number of implementation options against the home site database to identify a subset of implementation options.

* * * * *